Figure 2B:
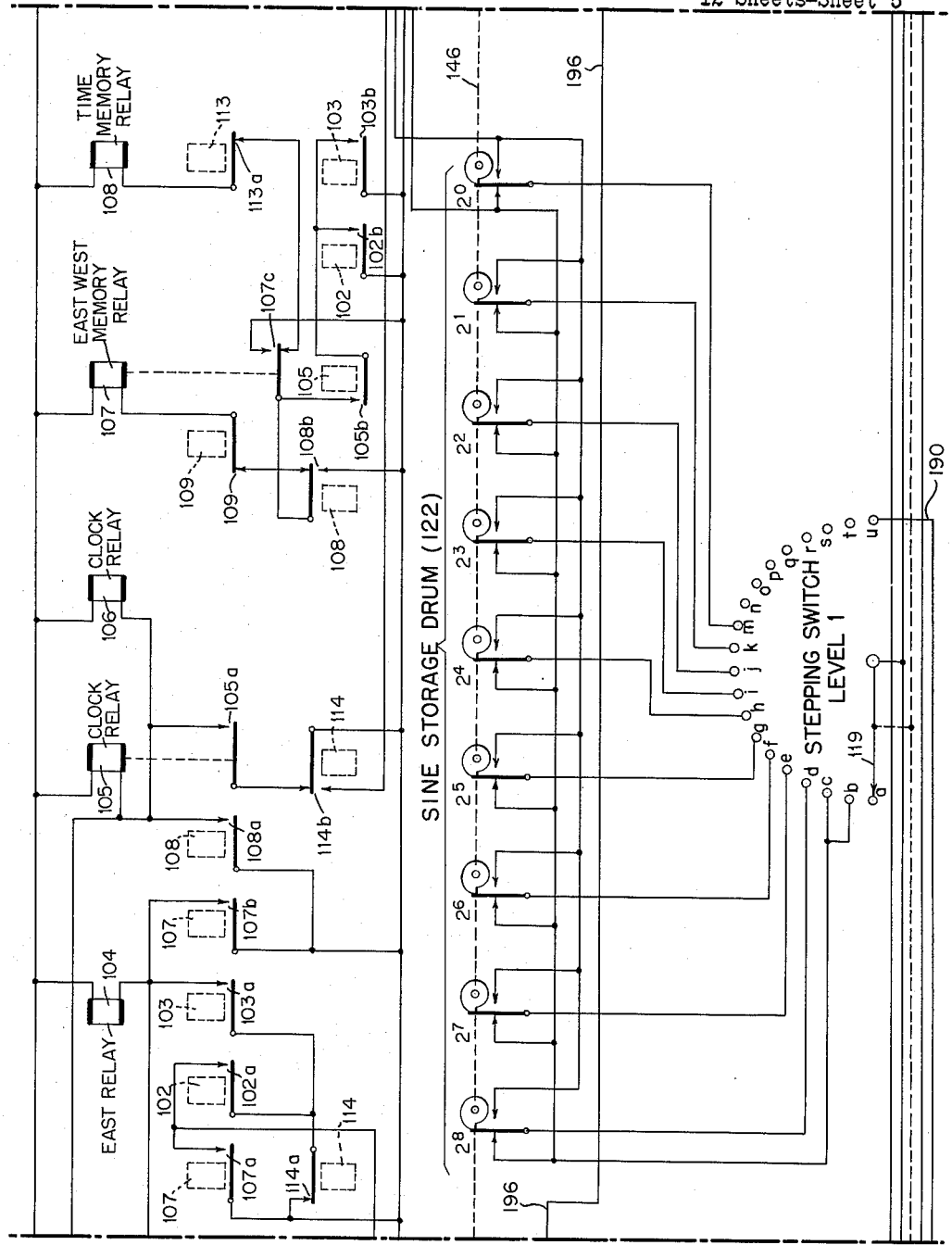
Figure 2C:
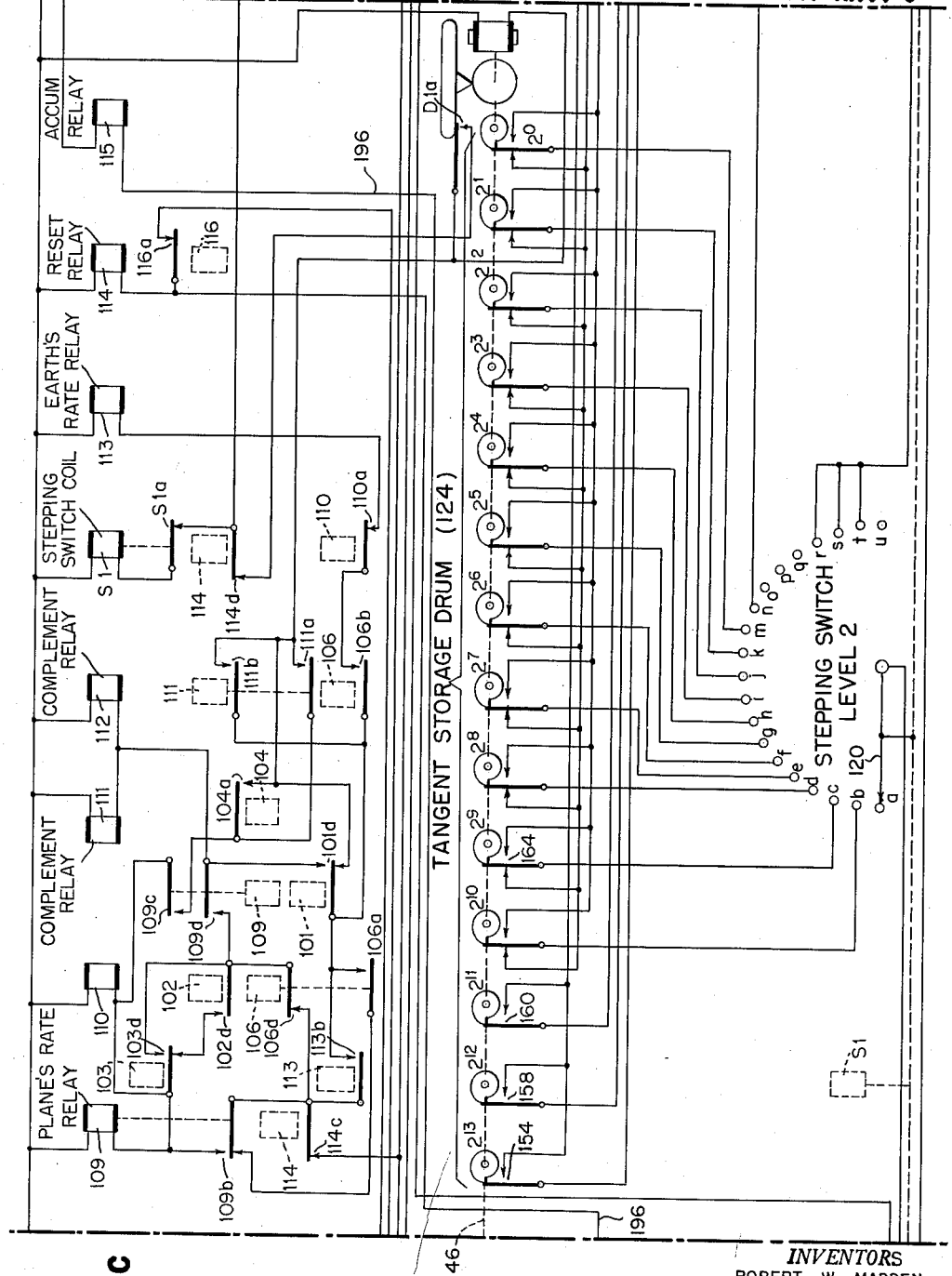

June 20, 1961 R. W. MADDEN ET AL 2,988,818
AZIMUTH DIRECTIONAL REFERENCE SYSTEM
Filed Jan. 6, 1954 12 Sheets-Sheet 1
FIG. 1a
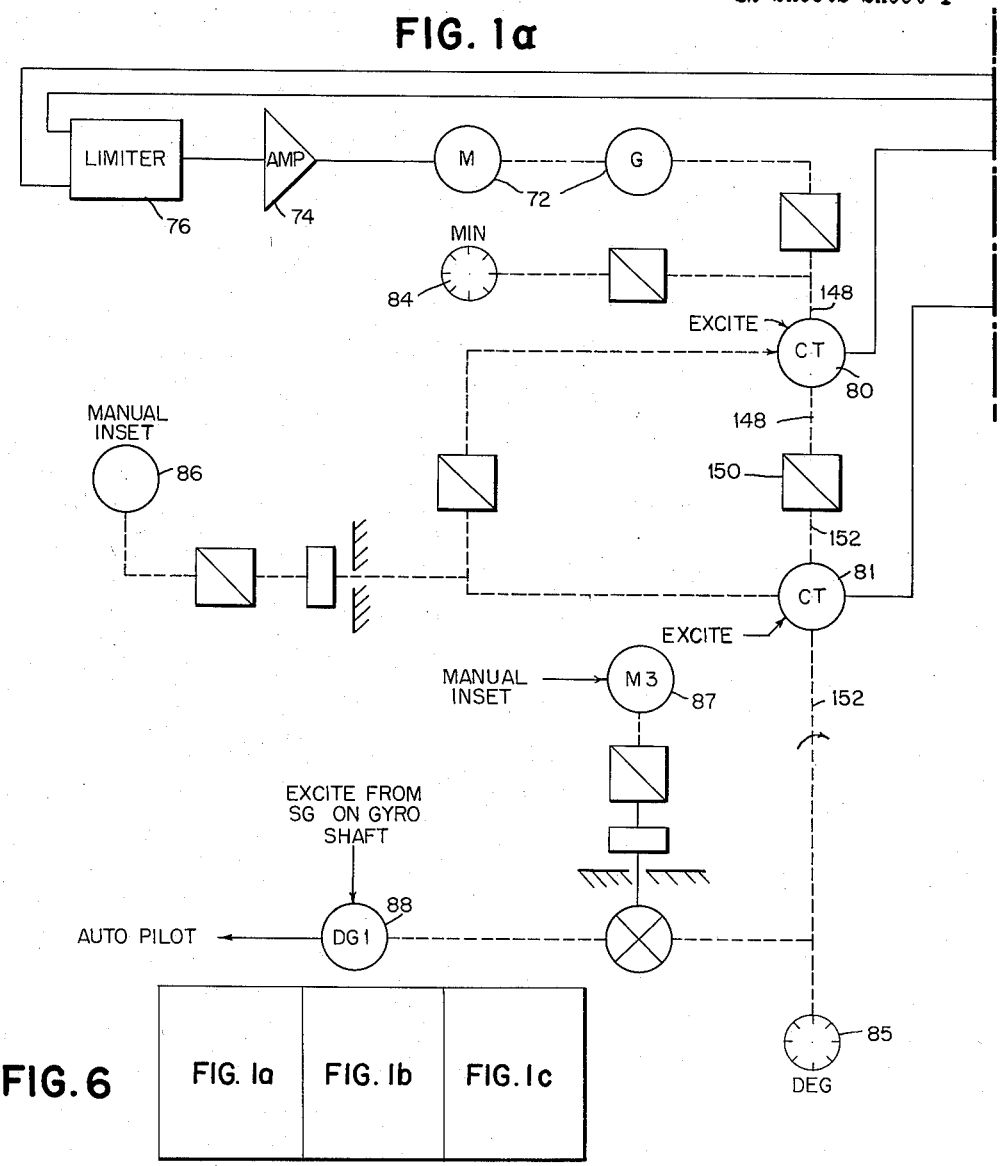
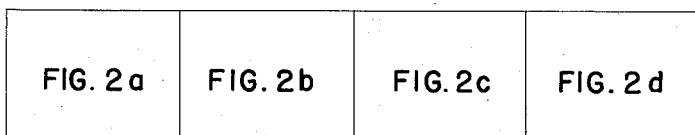
FIG. 7
*INVENTORS*
ROBERT W. MADDEN
JOHN E. LUNDBERG
FREDERIC A. FOSS
HENRY T. MARCY
BY P. E. Henninger
ATTORNEY

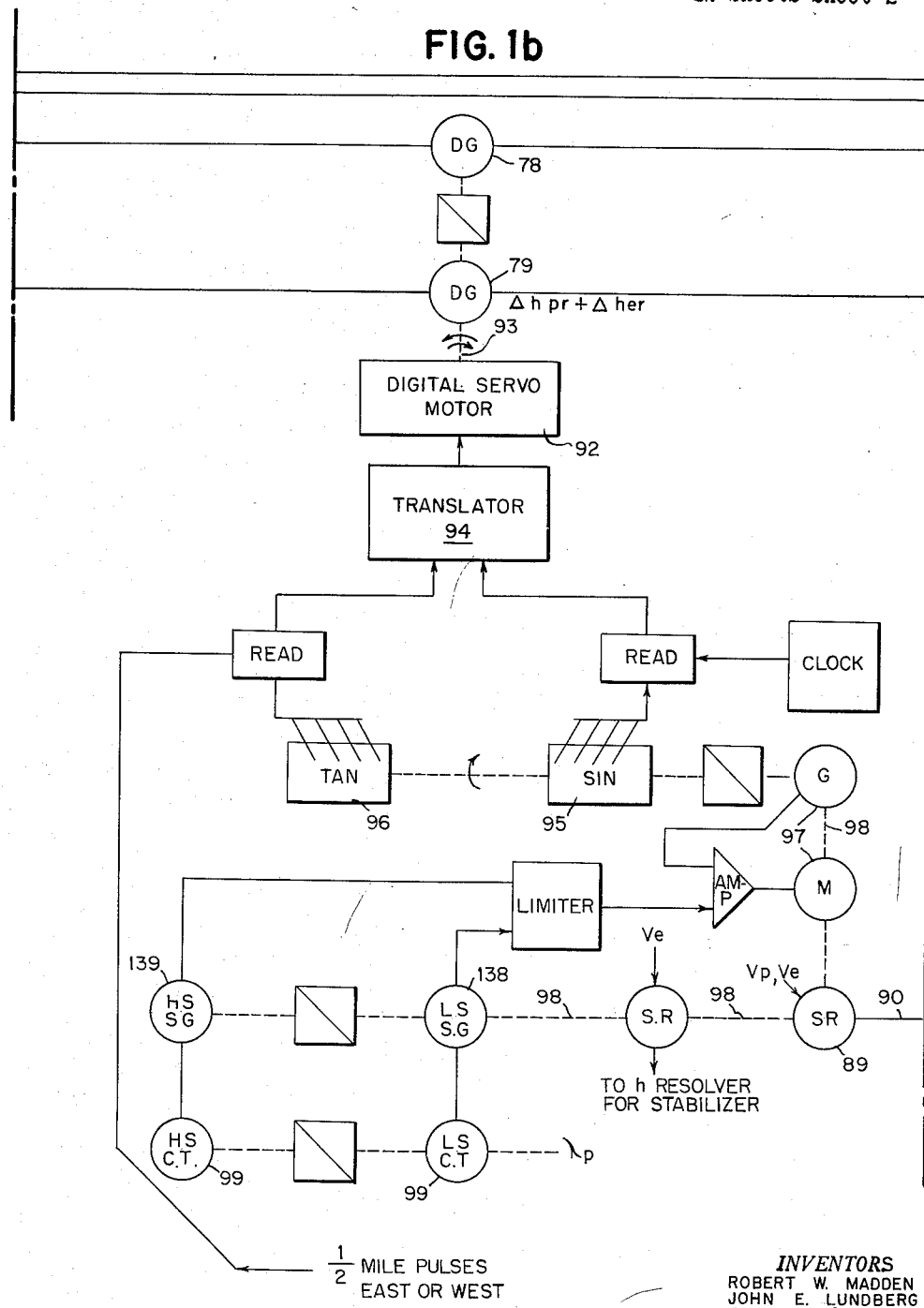

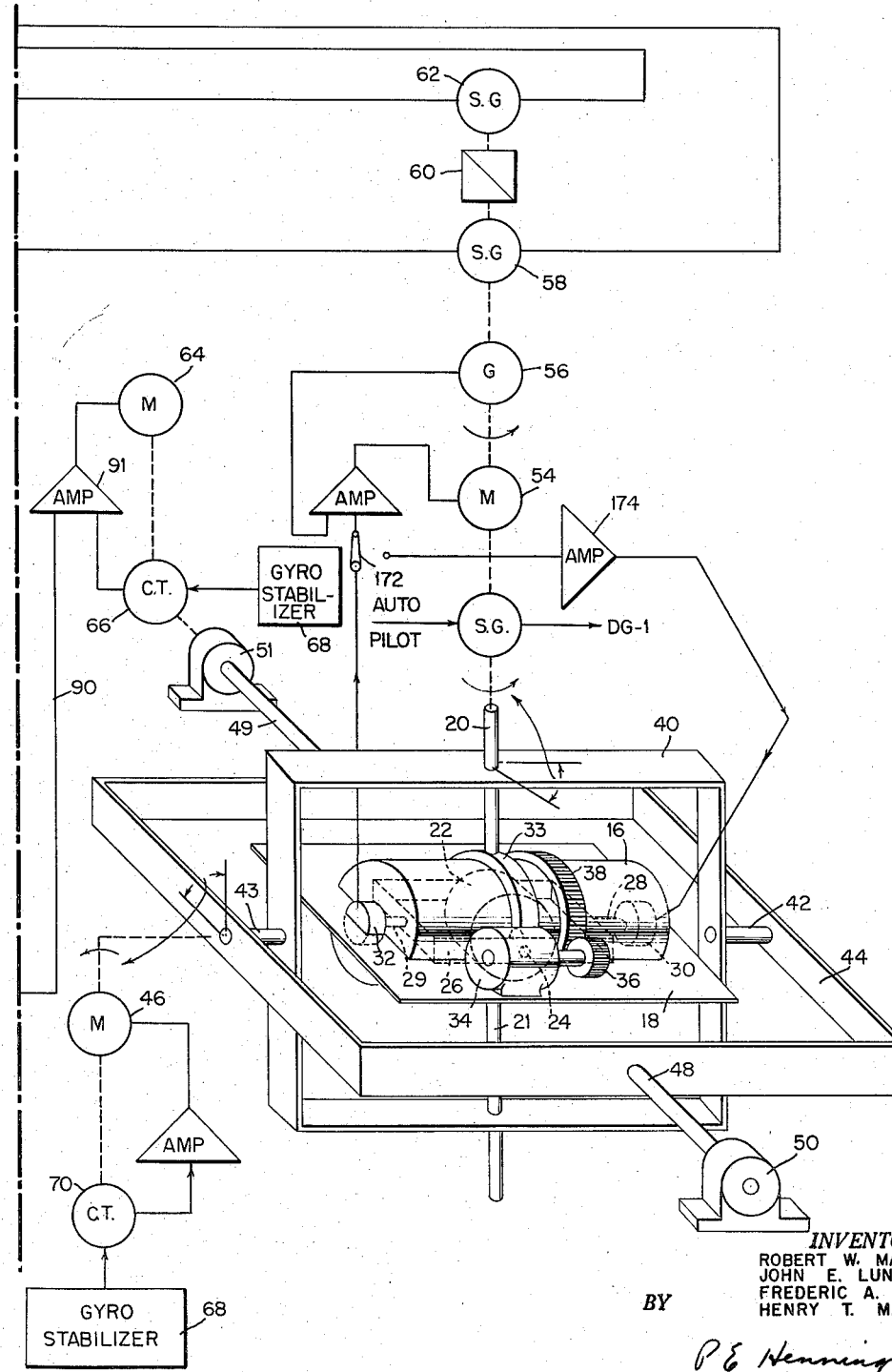

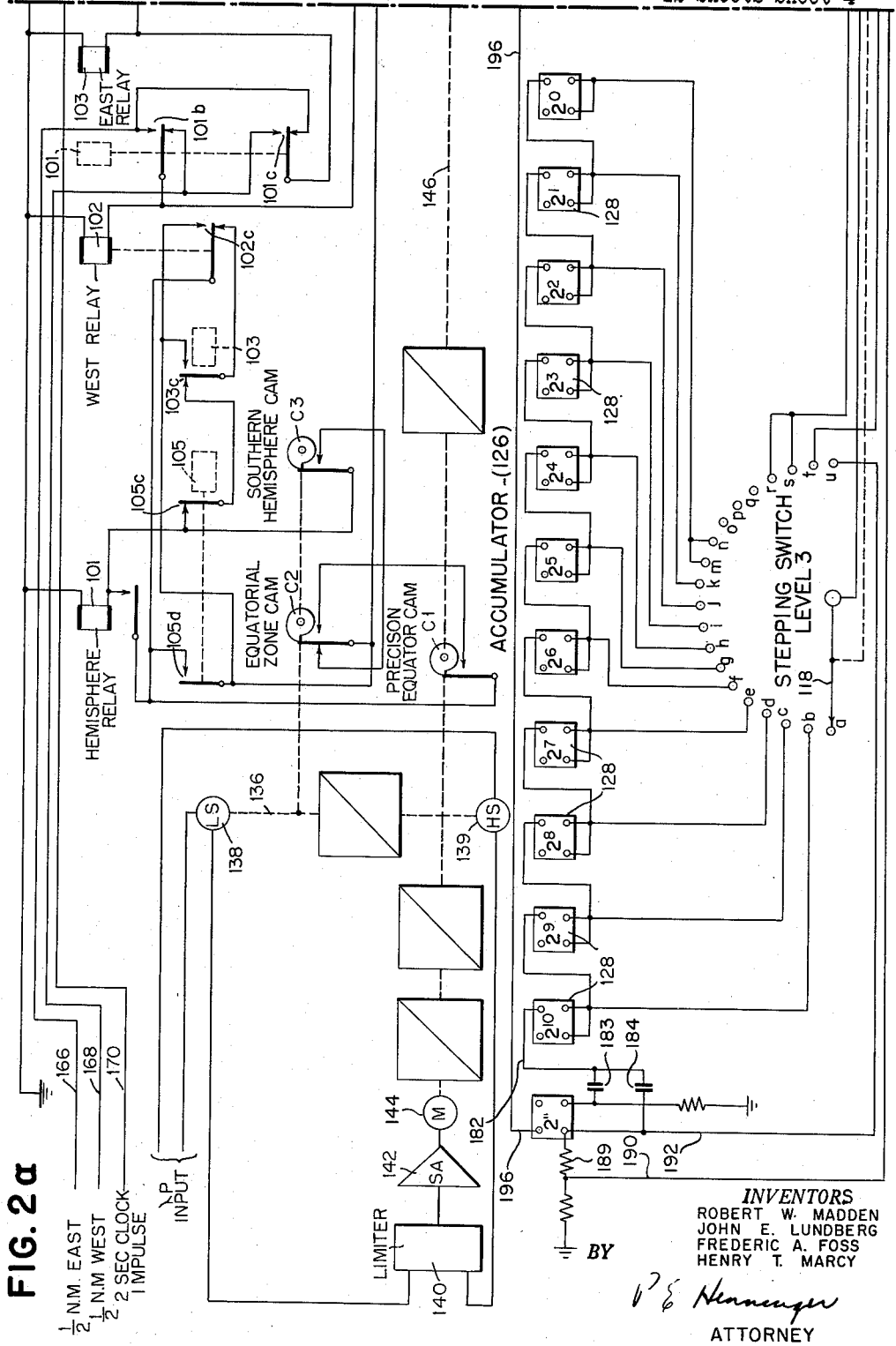

INVENTORS
ROBERT W. MADDEN
JOHN E. LUNDBERG
FREDERIC A. FOSS
HENRY T. MARCY

BY P E Henninger
ATTORNEY

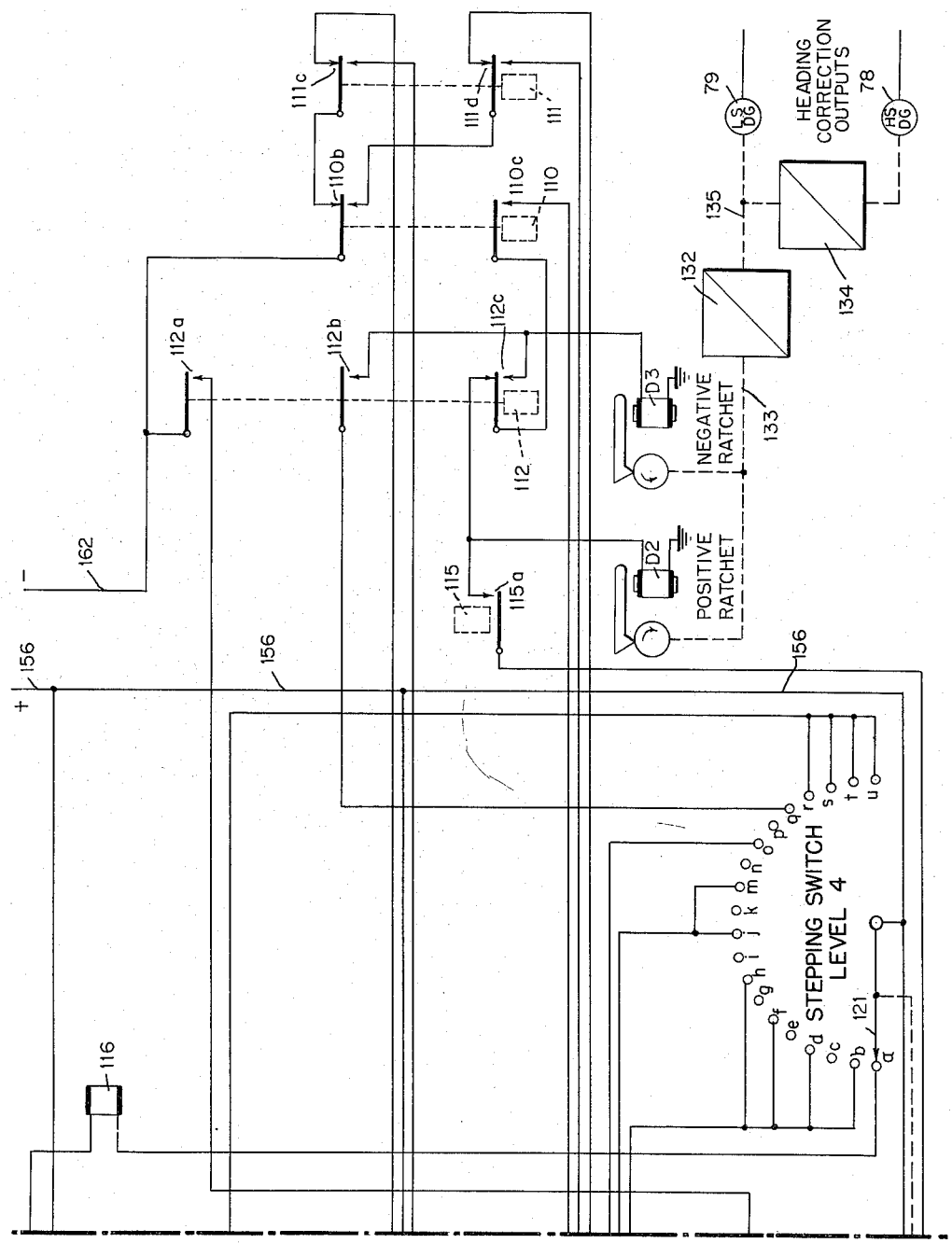

June 20, 1961   R. W. MADDEN ET AL   2,988,818
AZIMUTH DIRECTIONAL REFERENCE SYSTEM
Filed Jan. 6, 1954   12 Sheets-Sheet 8

OPERATIONAL EXAMPLE NO. 1

AIRCRAFT IN NORTHERN HEMISPHERE, EASTERLY HEADING, 1/2 NAUTICAL MILE EAST INPUT IMPULSE RECEIVED.

FIG. 3

INVENTORS
ROBERT W. MADDEN
JOHN E. LUNDBERG
FREDERIC A. FOSS
HENRY T. MARCY
BY P E Henninger
ATTORNEY

OPERATIONAL EXAMPLE NO. 3
AIRCRAFT IN SOUTHERN HEMISPHERE, WESTERLY HEADING, 2 SECOND TIME INPUT PULSE RECEIVED. (1/2 NAUTICAL MILE WEST INPUT PULSE RECEIVED DURING PROCESSING OF TIME PULSE.)

INVENTORS
ROBERT W. MADDEN
JOHN E. LUNDBERG
FREDERIC A. FOSS
HENRY T. MARCY

BY

P. E. Henninger
ATTORNEY

United States Patent Office 2,988,818
Patented June 20, 1961

2,988,818
AZIMUTH DIRECTIONAL REFERENCE SYSTEM
Robert W. Madden, Vestal, John E. Lundberg, Johnson City, Frederic A. Foss, Binghamton, and Henry T. Marcy, Vestal, N.Y., assignors to International Business Machines Corporation, New York, N.Y., a corporation of New York
Filed Jan. 6, 1954, Ser. No. 402,470
5 Claims. (Cl. 33—204)

This invention is concerned with a system for determining an azimuth directional reference. More specifically, the system of the invention includes a gyro and a computer both of which in combination are used to make a determination (with a high degree of accuracy) of an azimuth directional reference.

In navigation, when using dead reckoning, the accuracy of the navigation depends upon the ground velocity and the heading of the vehicle. This invention is concerned with a system for determining heading with such a high degree of accuracy that dead reckoning navigation may be carried out with an accuracy not heretofore possible.

Even though, with modern techniques, the ground velocity may be determined to a high degree of accuracy; it has not heretofore been feasible to make a determination of the heading of a vehicle with sufficient accuracy to produce results that may be carried to the same degree of accuracy with which ground velocity may be measured. By making use of the system of this invention, however, the heading may be determined with a comparable degree of accuracy to the determined accuracy of the ground velocity and therefore highly reliable dead reckoning is made possible.

An object of this invention is to provide a highly accurate directional reference without recourse to the earth's magnetic field, the stars, or electromagnetic information.

Another object of our invention is to make use of a system in which required corrections that must be added to a gyroscopically maintained directional reference, may be so added without applying any torque or torques to the gyro.

Another object is to provide a system employing a single degree of freedom gyro, and wherein the system may be employed to provide a north seeking action alternatively to providing a directional reference that is stable in inertial space.

These and other objects including the novel features and principles of the invention will appear as the complete description of the system is set forth in the following specification and accompanying drawings, by way of example.

In the current state of gyro development, highly accurate reference as related to inertial space is possible. By making use of the system of this invention, the combination of a digital type computer that will produce corrections of a desired degree of accuracy, may be made with such an accurate gyro reference. Therefore, a directional reference having as good or better accuracy than the inertial reference of modern gyroscopes, may now be obtained.

Figure 4:
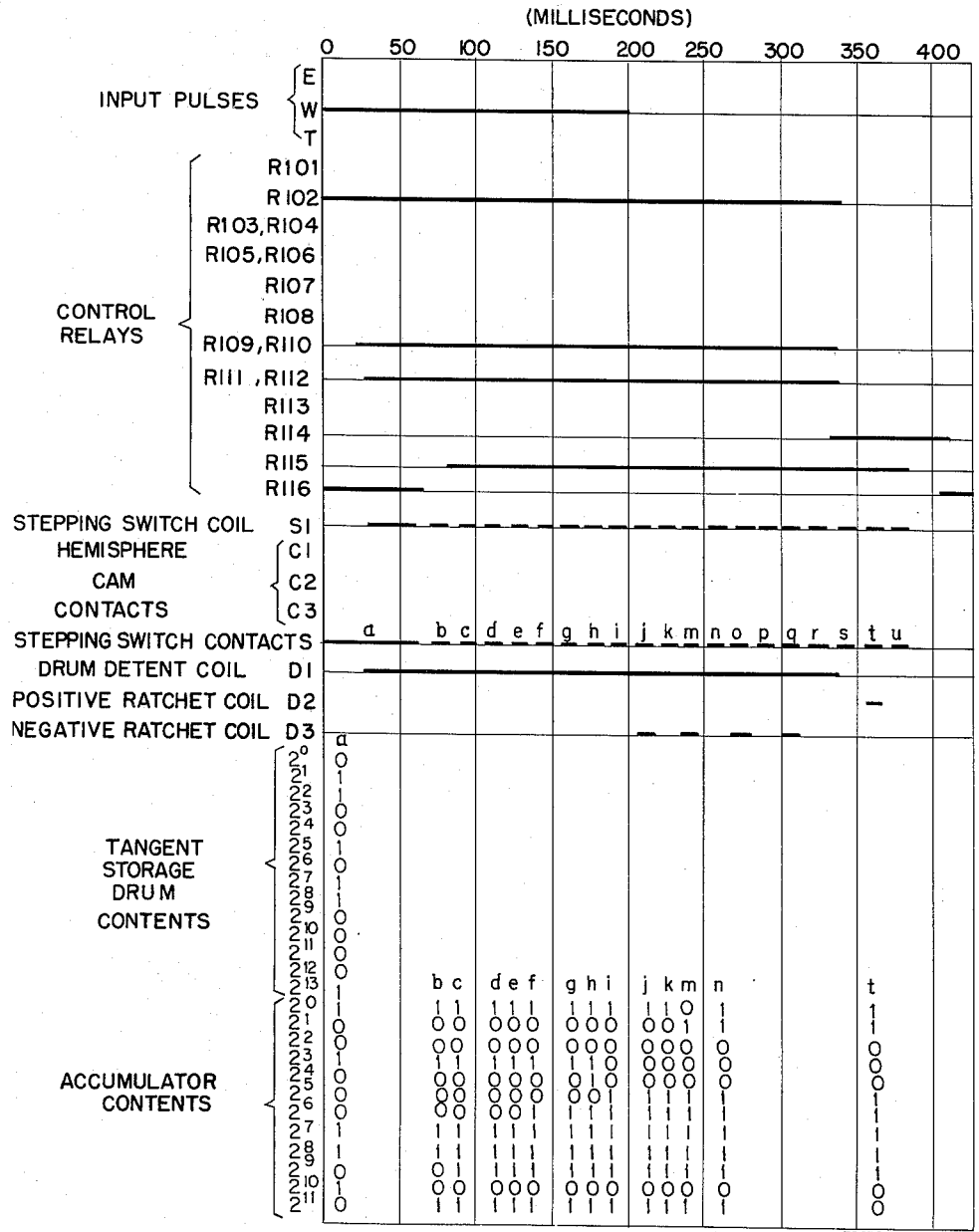
Figure 5:
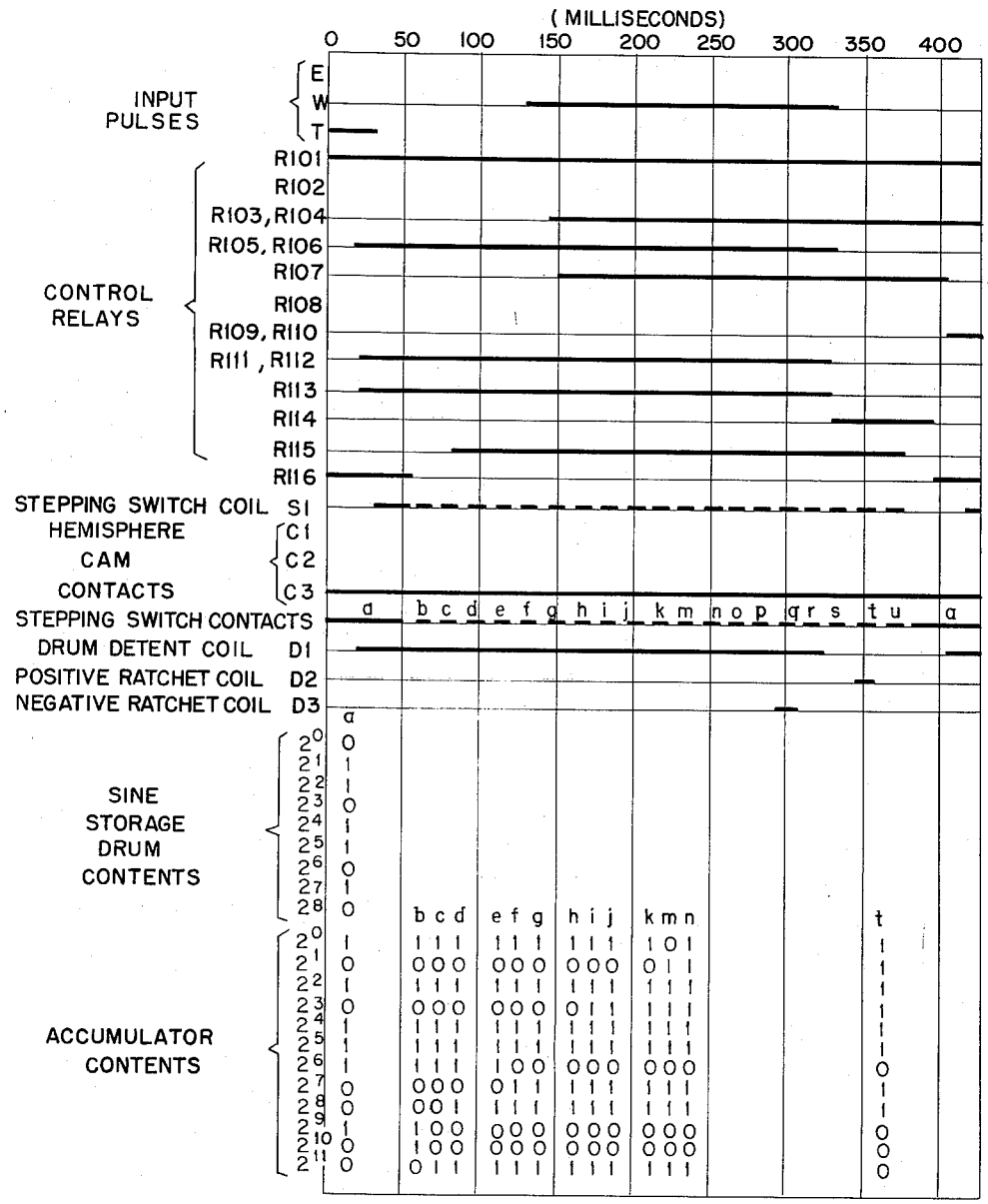
Figure 8:
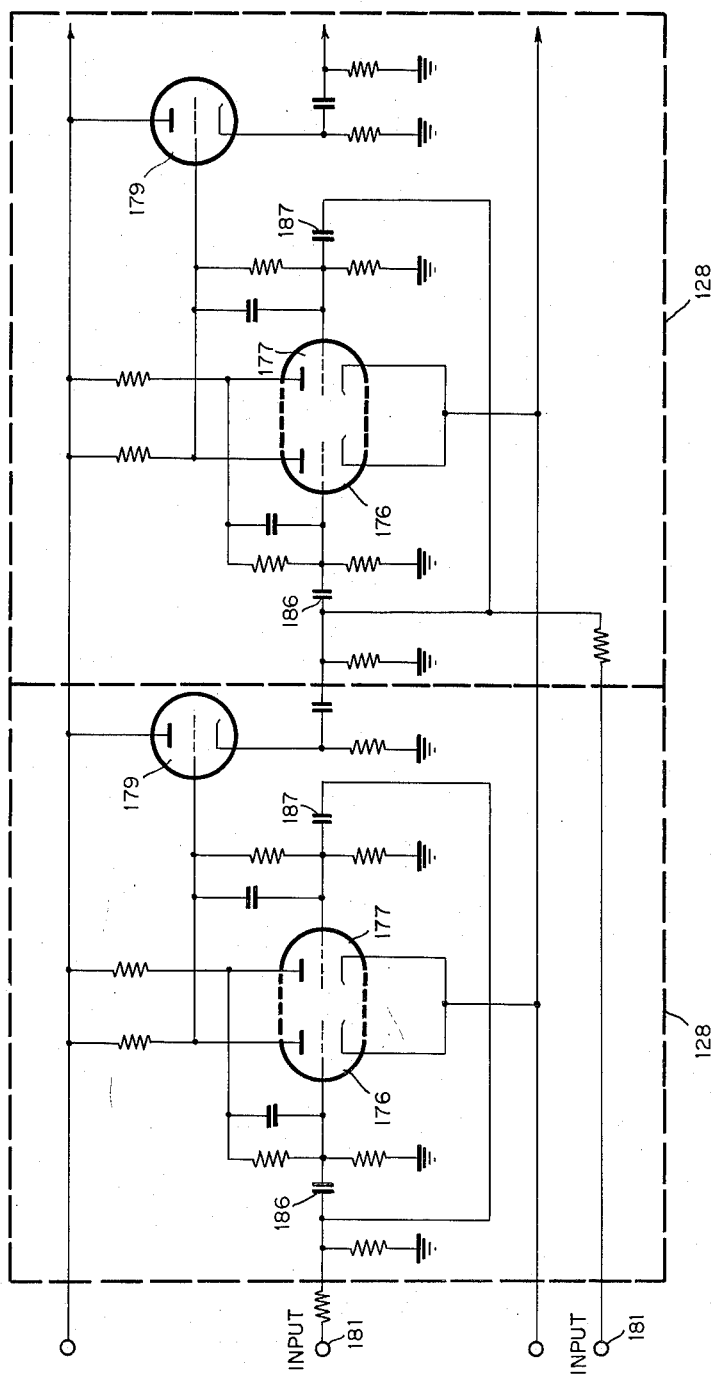
Figure 9:
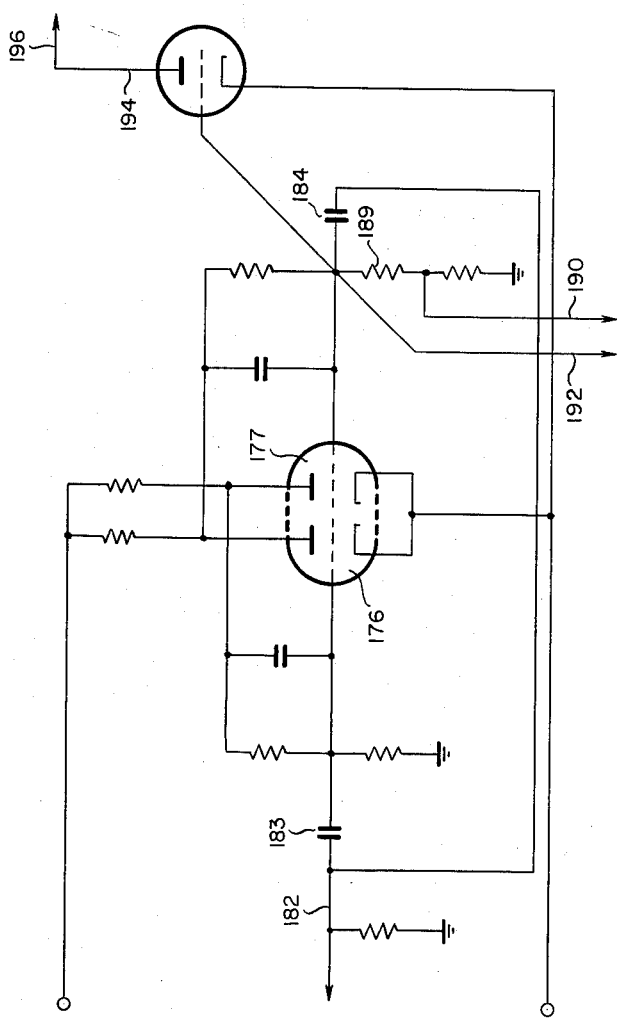

In the drawings:
FIGS. 1a, 1b and 1c all combined together show a schematic layout of the complete system of our invention;
FIGS. 2a, 2b, 2c and 2d are detailed circuit diagrams showing the elements involved in the computer section of the invention;
FIGS. 3, 4 and 5 are timing charts illustrating three different operative examples;
FIGS. 6 and 7 are sketches showing the relative positions for FIGS. 1a–1c and for FIGS. 2a–2d, in order to make a complete circuit diagram in each case;

FIG. 8 is a circuit diagram showing two electronic flip-flop elements connected together; and
FIG. 9 is a circuit diagram of the highest order ($2^{11}$) flip-flop element.

The complete system of the invention, as schematically illustrated in FIGS. 1a, 1b and 1c, may be subdivided, for purposes of explaining the operation, into three elements or components of the complete system. These components are: the master indicator illustrated in FIG. 1a, the computer section illustrated in FIG. 1b, and the gyro reference element illustrated in FIG. 1c.

The elements involved in the gyro reference portion of the system include a single degree of freedom gyroscope 16 which is supported on a stabilized platform 18 that is supported by a pair of vertically positioned shafts 20 and 21. The center line of these shafts 20 and 21 is known as the input axis of the gyroscope 16 when the gyro is in the position illustrated in FIG. 1c. The gyroscope 16 contains a rotor 22 that is driven by any convenient means (not shown), at some predetermined high rotational velocity to obtain good gyro stability. This rotor 22 is supported for rotation about a normally horizontal axis composed of the center line of a shaft 24. The shaft 24 is journaled in a gimbal 26, which in turn is carried by a pair of shafts 28 and 29. Located on the end of shaft 28 is a torque motor 30 for applying correcting torques between the platform 18 and the gyro gimbal 26, in a conventional manner and for a purpose to be explained below. Located at the end of the other shaft 29 is a signal pick-off 32 which is actuated by precession of the gyro rotor 22 about its output axis, i.e., the axis of rotation of the gimbal 26 as determined by the shafts 28 and 29. It will be understood that the pick-off 32 generates signals upon relative rotational displacement between the platform 18 and the gyro gimbal 26.

The exterior of the gyroscope 16 is supported by the shafts 20 and 21 and may be bodily rotated about its longitudinal axis by sliding within a ring or collar 33. Such rotation of the housing of gyro 16 is accomplished by means of a motor 34 that is mounted on the platform 18 and that carries a pinion 36 which meshes with a gear 38 that is securely attached to the outside of the housing of gyro 16 for imparting rotation thereto. By means of the motor 34 the housing of gyro 16 may be rotated in order to reverse the relative positions of the input axis for the gyro 16 and the spin axis thereof. In other words, when the housing of gyro 16 is rotated ninety degrees by means of motor 34, the spin axis of the gyro which was in the horizontal plane will be oriented into a vertical position while the input axis of the gyro which was in a vertical position will be oriented into the horizontal plane. It will be noted that the housings for torque motor 30 and pick-off 32 will be bodily rotated along with the housing of gyro 16 so that no change in the relative positions of the pick-off or torque motor elements takes place due to the rotation of the gyro housing.

The reversal of the gyro's input and spin axes makes it possible to introduce the "north seeking" operation of the gyro for initially orienting the gyro about its azimuth axis so that the gyro index will lie directed along a great circle that passes through the north pole.

Such north seeking operation will be explained in greater detail hereafter. It is to be noted that normal operation of the gyro system involves the gyro elements in the relative positions as illustrated in FIG. 1c. It will be observed that the platform 18 is rotatably supported in a gimbal frame 40 by means of the shafts 20 and 21 that are journaled in the frame 40. The gimbal frame 40 is in turn supported by a pair of shafts 42 and 43 integrally attached thereto for rotation therewith about a horizontal axis. The shafts 42 and 43 are journaled in an outer gimbal frame 44, and one of these shafts, e.g. shaft 43, has a servo motor 46 connected thereto for producing relative rotation between the shafts 42, 43 and the gimbal frame 44. The outer gimbal frame 44 is supported by a pair of shafts 48 and 49 that are integrally attached to the frame 44 and are located at right angles to the shafts 42 and 43. These shafts 48 and 49 are journaled in bearings 50 and 51, respectively, which are carried by the vehicle (not shown) upon which the directional reference system of our invention is mounted.

Attached to shaft 20 is a motor 54 for producing or controlling relative rotation between gimbal frame 40 and platform 18. Also attached to shaft 20 is an ordinary servo generator 56 for producing a rate feed back signal to the servo motor 54. Another device attached to the shaft 20 is a high speed signal generator 58, while attached to the same shaft 20 through an appropriate ratio reduction gearing 60 is a low speed signal generator 62.

Attached to one of the shafts that supports outer gimbal frame 44, e.g. shaft 49, is a servo motor 64 and a control transformer 66. This servo motor 64, with its control transformer 66, ordinarily receives control signals from a gyro stabilizer 68 which is illustrated by a box marked "gyro stabilizer." In a similar manner the motor 46 has incorporated therewith a control transformer 70 which receives signals as fed from the gyro stabilizer 68. (For convenience, the stabilizer 68 is shown as two separate boxes.) In this manner the platform 18 will be normally stabilized about two horizontal axes at right angles to one another so that the gyroscope 16 will be maintained in the local horizontal at all times irrespective of the location of the vehicle on the earth. The purpose of this will appear below.

A stabilizer gyroscope (not shown) may be incorporated directly on the platform 18 to affect its stabilization without the use of the servo motors 64 and 46, if this is found to be more convenient.

FIG. 1a illustrates that portion of the system that has been termed the master indicator, and the major elements involved are as follows: A servo motor-generator set 72 is driven by signals from an amplifier 74 which in turn is fed by a limiter 76. A limiter is necessary to correlate the signals from the high and low speed signal generators 58 and 62. The input signals to the limiter 76 are determined by a high and low speed, closed feed back system which includes the signal generators 58 and 62 of the gyro unit as well as a set of differential generators 78 and 79 and a set of control transformers 80 and 81. The motor-generator set 72 drives a pair of indicators 84 and 85 that are appropriately geared through the proper ratios to the shaft driven by the motor generator set 72. These indicators 84 and 85 produce a visual indication of the corrected azimuth direction in degrees and minutes to a desired degree of accuracy, as determined by the calibration of these indicators. It will be observed that there are two manual inset motors 86 and 87, which are for manually setting the indicator to any desired heading, and for introducing a manual adjustment between the master indicator and a differential generator 88 which introduces a control signal to the autopilot of the vehicle.

It is to be understood that the schematic diagram of FIGS. 1a, 1b and 1c uses a single wire showing for the circuits involving the servo motors and the associated control transformers, signal generators, differential generators, etc. These circuits are standard electric servo system circuits, and the representation of the wires connecting the multiple windings of the various elements such as the signal generators, the differential generators, etc., by a single line is common practice in servo system diagrams in general. It is to be noted that a control transformer and a signal generator are structurally identical and where one is electrically excited, the other produces an electric signal output. For this reason the designation given these two elements is sometimes reversed, but this should not confuse anyone skilled in the electric servo system art. In a similar manner, a resolver is a well-known rotary machine, used in electric servo systems, that has a pair of windings at right angles to one another which together may be rotated relatively to at least one additional winding so as to resolve a signal in the additional winding into its components, depending upon the relative rotor angle of the machine.

In order to understand the elements of the computer portion of the system, i.e. that illustrated in FIG. 1b, it will be necessary to review the theory involved in computing the necessary corrections. These corrections are to be added algebraically to the directional reference that is obtained from the gyro unit as illustrated in FIG. 1c. As stated above, the gyro unit employs a single degree of freedom gyro that is oriented, as illustrated in FIG. 1c, with its input axis (shafts 20 and 21) vertical. Therefore, when the vehicle begins to turn, the gyro is caused to precess about its output axis (shafts 28 and 29) and so produce a signal in pick-off 32. The signal in pick-off 32 will energize the motor 54 and cause it to run in a direction such that the input axis rotation is reversed and the gyro precesses the other way until the signal from pick-off 32 is zero. By this action the gyro 16 and its platform 18, with the supporting shafts 20 and 21, will all be stabilized in inertial space, about the single axis of freedom (within the inherent capabilities of the gyro 16 and of the servo drive including motor 54).

Among the reasons for maintaining the gyro platform 18 stabilized in a horizontal plane are the factors involved in the actions of a gyroscope. With the gyro 16 stabilized with its input axis in the local vertical, all extraneous torques will be eliminated.

The gyro stabilizer 68 may be any convenient stabilizer that will produce signals adaptable to feed synchro control transformers such as transformers 66 and 70. These signals will be taken from a stabilizer that is oriented with its corresponding axes parallel to the horizontal axes of platform 18 about which it is being stabilized. A satisfactory stabilizer for this purpose is the type given a military designation "Mark 12"—vertical gyro.

A stabilizer such as that used in the invention is not corrected for the effects of Coriolis acceleration, and since the platform 18 should not contain the effects of the accelerations of Coriolis, a correction factor is introduced into the control circuit for motor 64. The component of the Coriolis acceleration about the pitch axis of the vehicle is small, since that effect is proportional to the ground velocity of the vehicle perpendicular to its heading direction, so that no correction need be introduced into the control circuit for motor 46. The component of the Coriolis acceleration around the roll axis is proportional to the ground velocity of the craft in the heading direction, and this is compensated for by feeding an additional signal to the motor 64. This additional signal is made up of the product of the ground velocity parallel to the heading direction of the craft times the earth's rate and times the sine of the present latitude. A signal proportional to the velocity parallel (designated $V_p$) times the earth's rate (designated $V_e$—which is a constant), is introduced to a resolver 89 (FIG. 1b) that is positioned corresponding to the present latitude (designated $\lambda_p$) so that the sine function is introduced. This signal is fed over a line 90 (FIGS. 1b and 1c) to an amplifier 91 (FIG. 1c) that feeds the motor 64.

The system essentially consists of the single axis gyro 16 mounted on platform 18. The platform 18 is stabilized in the horizontal plane by being slaved to the gyro stabilizer 68. Hence this platform is stabilized perpendicular to the local vertical within the capabilities of the stabilizer 68 and the associated servo drives. The input axis of the single axis gyro 16 is perpendicular to the horizontal plane thus formed. Hence, the input axis is along the local vertical. Since the gyro is sensitive to rotations about that axis, it is used to detect such rotations and provide signals from pick-off 32 to the servo drive along the azimuth axis, which includes motor 54. The platform is driven in azimuth in a direction to null out said signals. Hence the platform 18 is controlled by the action of the gyro 16, and under most favorable conditions it will eliminate any rotation of the platform, about the azimuth axis, with respect to inertial space. Hence a fixed reference in azimuth is obtained. In order that such a reference be fixed with respect to a point on the earth, correction for earth's rate and for plane's rate are required. In this system these corrections will be made in the azimuth reference computer section (FIG. 1b).

As explained above, the gyro platform 18 is slaved to the local horizontal, and therefore, by reason of the action of the gyro 16 in connection with motor 54, the platform 18 is restricted so that it cannot rotate about the local vertical with respect to inertial space. Because it cannot rotate about that vertical and because it must remain in a plane which is tangent to the surface of the earth, it is necessary to continually compute the direction between the great circle indicated by the gyro heading and true north. This computation involves two factors that must be taken into account; one is the change in the great circle as indicated by the gyro platform 18 and true north, that is due to the craft's rate. This is continuously computed by increments, and the equation representing this computation is as follows:

(1) $$h_{pr} = \Sigma K \tan \lambda$$

where $h_{pr}$ = the heading correction due to the plane's (craft) rate
$K$ = a constant
$\lambda$ = the latitude of the craft.

This Equation 1 is derived from the solid geometry involved in the navigation situation being considered, the summation increments being a predetermined distance of travel of the craft in an east-west direction.

The second factor to be taken into account is the change in the great circle as indicated by the platform 18 and true north, that is due to the earth's rate. This is continuously computed by summation increments also, and the equation representing this computation is as follows:

(2) $$h_{ER} = \Sigma K_2 \sin \lambda$$

where $h_{ER}$ = the heading correction due to the earth's rate
$K_2$ = a constant dependent upon the increments of time employed
$\lambda$ = the latitude of the craft.

This Equation 2 is likewise derived from the solid geometry involved in the navigation situation under consideration. The increments in this case are intervals of time, e.g. two seconds.

As shown schematically in FIG. 1b, theer are two computers acting in a unitary manner to introduce the two corrections due to earth's rate and plane's rate alternately into the system. The high and low speed differential generators 78 and 79 have their rotors positioned in accordance with the corrections as computed. There is a digital servo motor 92 that is reversibly actuated to rotate a shaft 93 in either direction as indicated by the arrows. The elements of these computers are self-explanatory when it is understood that there is a common translator 94 and that the computers are solving the expressions represented by Equations 1 and 2 above. The sine and tangent terms of these two equations are set up on two separate storage mechanisms 95 and 96, respectively. These may be in either form of a tape with a code carrying the respective term quantity thereon, or in the form of a set of coded helical drums. In either case the storage mechanisms 95 and 96 are positioned by means of a servo including a motor-generator set 97 to correspond to the craft's latitude. The controlling signals for the motor-generator 97 are fed by the usual amplifier and limiter, as illustrated, and the feed back to make this a position servo is accomplished in the well-known manner, i.e. by a mechanical connection illustrated by a dashed line 98.

The present latitude of the craft is computed by means of a separate computer that forms no part of the present invention; and any feasible means may be used to position a set of high and low speed synchro generators 99 in correspondence with the present latitude of the craft. An example of such a computer may be found in a copending application Serial No. 396,838, filed December 8, 1953. This present latitude information might also be manually introduced in correspondence with current navigation information, by positioning the rotors of high and low speed synchro generators 99 by hand.

THE COMPUTER SECTION

FIGS. 2a, 2b, 2c and 2d illustrate the circuit diagram for the computer section involved in the system. The computer elements are generally those illustrated functionally in the FIG. 1b portion of the schematic showing for the entire system. These computer elements include sixteen relays, 101 through 116, which have captions adjacent to the relay winding of each to indicate the principal function of each relay. There is a stepping switch having four levels: level 3 being illustrated in FIG. 2a; level 1 being illustrated in FIG. 2b; level 2 being illustrated in FIG. 2c; and level 4 being illustrated in FIG. 2d. When the stepping switch coil 51 (FIG. 2c) is energized, the switch will sequentially complete twenty circuits as the coil 51 causes a stepping action of contact arms 118 (level 3—FIG. 2a), 119 (level 1— FIG. 2b), 120 (level 2—FIG. 2c), and 121 (level 4—FIG. 2d), from one contact to the next, all four arms moving simultaneously, until a cycle has been completed following the completion of the last circuit, i.e. circuit $u$. There is a sine storage drum 122 (FIG. 2b) which is used in the correction for earth's rotation, in the manner explained above. Similarly, there is a tangent storage drum 124 (FIG. 2c) that is used in computing the vehicle's displacement correction as was explained above. Another element of the computer section is an accumulator 126 (FIG. 2a) that is an electronic binary accumulator having the desired number, e.g. 12, so-called flip-flop elements 128. These elements 128 are standard trigger circuits and operate in the usual manner to indicate the presence of, or pass on from the preceding element, a binary 1 in given elements 128 of the accumulator 126.

It is to be understood that the sine and tangent terms of Equations 1 and 2 above are represented by binary information that is predetermined and built into the drums 122 and 124; there being cam surfaces so constructed that for each position of the drum in rotation there is a quantity representing the sine or tangent term of the respective equations for a given latitude; and the drums being rotated in unison and in correspondence with the craft's present latitude as explained above. The tangent term of the Equation 1 may be varied from true tangent quantities in order to take into account the non-sphericity of the earth. Each time an increment of correction for earth's rate or for craft's rate (as explained above) is to be determined, the quantity contained on the sine drum or on the tangent drum, respectively, is read off by a cycle of the stepping switch that causes a heading correction to be made. Such heading correction is made directly from the highest orders of the tangent drum quantities, and is read into the accumulator 126 from the lower orders of the tangent drum and from all of the orders on the sine drum. The accumulator keeps adding thees quantities as read in, until its highest order is reached by accumulation when a correction is read out to keep the heading accurate at all times.

To briefly review what the binary representation of the predetermined quantities for given latitudes consists of, it may be noted that in binary numbers the representation is by means of powers of two, so that the lowest order which is the two to the zero power ($2^0$) is represented by a one (1) or by a zero (0), and each higher order is likewise represented by a one or a zero. In this way any decimal number may be represented by a proper combination of ones and zeros in a series of binary orders. For example, starting with the lowest order on the right as is done in the illustrations of the drums 122, 124 and the accumulator 126, a number 15 is represented by 1111, while a number 16 is represented by 10000. Likewise a number 35 is represented by 100011 and a number 2 is represented by 10101.

A detailed circuit diagram of two of the flip-flop elements 128 is shown in FIG. 8. Only two of the twelve elements 128 which correspond to the binary orders from $2^0$ through $2^{11}$ are shown in FIG. 8 because each of the elements 128 is identical, and the action of two adjacent elements will be sufficient to explain the entire operation.

Each element 128 comprises two electron tubes 176 and 177, which may be two halves of a common envelope as shown. Also there is a tube 179 which is connected as a cathode follower and acts as isolation between succeeding elements 128. The two tubes 176 and 177 of each element 128 are connected so that they resemble two inverter circuits, each of whose plate outputs is coupled to the grid of the other circuit. The combination is stable in two separate states, i.e. either tube 176 or tube 177 is conducting while the other is cut off. In the circuit illustrated in FIG. 8, the lower order binary accumulator element 128 (FIG. 2a) is shown on the left, and it will carry output signals over to the element 128 for the next higher order which is shown on the right. This is the reverse of the physical positions shown for the elements 128 in FIG. 2a.

By choosing one of the two stable states, e.g. when tube 176 is conducting, to represent a binary zero, the other stable state, i.e. when tube 177 is conducting, will represent a binary one. Therefore when the accumulator 126 is empty (before any quantity from either storage drum 122 or 124 has been read in) the tube 176 will be conducting in each case, and each element 128 will be representing a zero. Now each time a binary one is stored on one of the drums 124 or 122, and the stepping switch sweeps the contact for the input to the corresponding element 128 of the accumulator 126, a negative pulse will be introduced via an input terminal 181 to the two cross-coupled circuits for tubes 176 and 177. This pulse will cause the flip-flop action of such a circuit to take place, so that the tube 176 or 177 which was conducting will be cut off while the other one will become conducting. Therefore all elements 128 that received pulses will be flipped over and their tubes 177 will become conducting. Now whenever subsequently a negative pulse is received at the cross-coupled circuits of the tubes 176 and 177, they will be flopped back to the condition with the tube 176 conducting. However, when the reverse or flopping action takes place, a negative pulse will be passed on to the next succeeding pair of tubes 176, 177, via the cathode follower circuit of tube 179, and this pulse will act on the cross-coupled circuits of these tubes 176, 177 in the same manner as a negative pulse received from one of the drums 122 or 124. This passing on is a carry from one order to the next higher order in a normal manner for binary counting. This is similar to a decimal carry from a nine, in one order, to a one in the next higher order while returning the nine to zero.

It will be noted that when any element 128 has its tubes 176 and 177 flipped from zero condition to binary one condition, a pulse will be created in its cathode follower circuit for its tube 179, but this pulse will be a positive one so that it will not cause a flipping or a flopping of the next succeeding pair of tubes 176, 177.

It is to be also noted that the highest order element 128 of the accumulator 126 is the $2^{10}$ element. There is an element 128 marked $2^{11}$, but it is merely used to pass on a carry from the $2^{10}$ element as will presently appear. Furthermore, in this connection, it is pointed out that in order to have each carry from the $2^{10}$ element 128 passed on by the $2^{11}$ element, this $2^{11}$ element is connected in a special way as illustrated in FIG. 2a (see also FIG. 9).

Referring to FIG. 9 for the details of the circuit it will be observed that a wire 182 carries the negative pulses from the $2^{10}$ element 128 (FIG. 2a), and such pulses then are connected to the grids of the pair of tubes 176, 177 (FIG. 9) in the usual manner via condensers 183 and 184. It is to be observed that there is no other circuit to the common sides of condensers 183 and 184, than the one via wire 182 just described above. There is however, a circuit including a resistor 189 which involves wires 190 and 192. This circuit produces a reset pulse at the end of each read cycle so that whenever there has been an output pulse from the $2^{10}$ element 128 (and consequently the accumulator relay 115—FIG. 2c—has been actuated) the pair of tubes 176 and 177 of the $2^{11}$ element (FIG. 9) will be flipped over to be ready to pass on the next pulse received from the output of the $2^{10}$ element 128. This reset pulse acts only on the grid of the one tube 177 so that in the event that there has been no output pulse from the $2^{10}$ element 128 during any cycle, the status of the pair of tubes 176, 177 of the $2^{11}$ element will not be affected, and they will still remain ready to pass along any pulse received over the wire 182 out from the $2^{10}$ element 128.

The reset pulse just described is produced by short circuiting the resistor 189. This occurs when the stepping switch passes through its last position, i.e., makes contact with contacts $u$, so that a circuit is completed over arms 118 and 119 (level 3 and level 1 respectively), contacts $u$ and wires 190 and 192.

The $2^{11}$ element 128 employs a tube 194 (FIG. 9) that has its grid connected to the grid of the tube 177, while the plate of this tube 194 is connected to one side of the winding of accumulator relay 115 via a wire 196. In this way the operation is such that a reset pulse does not cause the tube 194 to actuate the accumulator relay 115, but whenever the $2^{11}$ pair of tubes 176, 177 is flipped over by an output pulse from the $2^{10}$ element 128 the tube 194 does allow sufficient current to flow to actuate the relay 115.

The sweep of the stepping switch is such as to read the binary numbers from the higher orders to the lower orders in that direction. This is an arbitrary direction because the carry action between elements of the accumulator is sufficiently fast to complete a carry all the way along the line, if necessary, between each binary digit circuit, so that the sweep could be the other direction insofar as the accumulator is concerned.

The output of the computer section (FIG. 1b) is mechanical in nature and comprises the positioning of the two synchro elements 78 and 79 (FIG. 2d). Such positioning is in rotation, of course, and is accomplished in this instance by means of an ordinary type of double acting ratchet motor. The two ratchet elements employed are captioned "positive ratchet" (D2) and "negative ratchet" (D3) in FIG. 2d. The coils for actuating these ratchets have the reference characters D2 and D3, respectively. There is an appropriate gear reduction means 132 between a ratchet driven shaft 133 and an input shaft 135 to the low speed differential generator 79, which gear reduction was described above in connection with the entire system. There is, of course, a necessary gear reduction 134 between low speed differential generator 79 and the high speed differential generator 78.

There are three cams C1, C2 and C3 (FIG. 2a) that are driven from a shaft 136 (corresponding to shaft 98 in FIG. 1) that is being positioned in rotation corresponding to the present latitude of the vehicle's position. These cams have captions indicating their functions, and their operation in the system will be described in greater detail below in connection with the operation of the computer section of the system. The present latitude input may be determined by any appropriate means as indicated above in connection with the entire system diagram, specifically FIG. 1b. As used in our system this present latitude information will be transmitted by means of an ordinary synchro arrangement such that a low speed synchro 138 and a high speed synchro 139 will produce electrical signals that are fed into a limiter 140, for combining the low and high speed signals, and from thence the signal as combined is amplified by an amplifier 142 which feeds its output signal to a motor 144 (corresponding to motor-generator 97 in FIG. 1b). This motor 144 supplies the power for mechanically positioning shaft 136 (corresponding to shaft 98 in FIG. 1b), as well as for positioning the connecting shafts illustrated which position the various elements in a predetermined manner, e.g., a shaft 146 is positioned in a manner to correspond with shaft 136 so that the sine storage drum 122 and the tangent storage drum 124 will be maintained in a position corresponding to the present latitude of the vehicle. The usual servo generator (not shown) may be included in the control circuit for motor 144 to obtain a rate feed back, should this be found desirable.

The sine drum 122 and the tangent drum 124 are each similar in construction and only differ in the number of digits to which the sine and tangent quantities are carried. The reason for this is that the sine quantities vary only to a maximum of unity while the tangent quantities vary to a practical maximum of 28.64 minutes where the K term of Equation 1 equals one-half and the latitude equals eighty-nine degrees. These quantities are set up on the drums in binary code. The drums are so constructed that there are quantities encoded on the drum surfaces that correspond to predetermined intervals of latitude of the craft. In this way, the proper quantity may be read off after each increment of change. The increments of change have been explained above as being predetermined increments of east-west ground travel of the craft, e.g. one-half nautical mile, in the case of the tangent drum—plane's rate correction, Equation 1; and as being predetermined increments of time, e.g. two second intervals, in the case of the sine drum-earth's rate correction, Equation 2. The quantities as read off the tangent drum are used to actuate the positive and negative ratchets D2 and D3 (FIG. 2d) when the quantities have high order binary digits therein. The quantities below a predetermined binary digital order in the tangent drum and all the quantities in the sine drum are read off into the accumulator 126, from where they are read out as they accumulate into the high order level.

It is to be understood that the quantities encoded in the storage drums are predetermined by a solution of Equations 1 and 2 for given values of latitude. These quantities are then represented by a binary code arrangement on the drum surfaces. The details of the structure of the drums may vary, but there is a series of cam surfaces located longitudinally along the length of the drum, each of which is constructed for actuating a switch, and each of which is designated by its binary order representation, e.g. $2^0$–$2^{13}$ on the tangent drum 124 and $2^0$–$2^8$ on the sine drum 122. The drums 122 and 124 are rotated by the common shaft 146 to an angular position that corresponds with the craft's present latitude as taken in predetermined steps, e.g. one degree, from eighty-nine degrees north to eighty-nine degrees south. At each of these positions the cams will actuate the corresponding switches to produce the quantity that was built into the drum, such quantity being represented in binary form, i.e. a one in the $2^0$ position equals one, a one in the $2^1$ position equals two, a one in the $2^2$ position equals four, a one in the $2^3$ position equals eight, etc. up to the desired number of positions to obtain a quantity having the desired number of positions to obtain a quantity having the desired number of digits for the required accuracy.

To best understand the computer section of the system some examples of the operation of the computer in supplying the necessary corrections for the rotation of the earth and the location of the vehicle will be given.

OPERATION

The operation of the whole system may be reviewed with reference to FIGS. 1a, 1b and 1c. The gyroscope 16 on stabilized platform 18 acts to maintain shaft 20 fixed in azimuth relative to inertial space by means of the servo loop that includes pick-off 32 on the output axis of gyro 16 and the motor 54 connected to shaft 20. Control transformers 58 and 62 also have their rotors connected to shaft 20 so that the inertially fixed azimuth is represented or maintained at these control transformers 58 and 62.

Electrically connected to the signal generators 58 and 62 is the servo motor-generator set 72 which is mechanically connected to a shaft 148 for positioning the rotor of high speed control transformer 80, and through a gear reduction 150 to a shaft 152 on the rotor of the low speed control transformer 81. The control transformers 80 and 81 are electrically excited as illustrated in FIG. 1a, and hence the position of shafts 148 and 152 are controlled by the gyro maintained azimuth position of shaft 20 and the rotors of signal generators 58 and 62. Connected to the shaft 148 by the required gear ratio is the minutes indicator 84 for the azimuth position, while connected to the shaft 152 is the degrees indicator 85 for this same azimuth position. Therefore the master indicator, as represented by the indicators 84 and 85, is slaved to the gyro controlled azimuth reference that remains constant relative to inertial space. However, to introduce the necessary corrections for earth's rate and the craft's rate as explained above, the computer, illustrated schematically in FIG. 1b, will position the rotors of high and low speed differential generators 78 and 79 that are electrically inserted between control transformers 80 and 81 and signal generators 62 and 58. Therefore, the corrections are algebraically introduced in a well-known "electrical servo system" manner so that the master indicator will continuously indicate a true north azimuth reference after having been properly set up initially.

The initial set up operation of the servo loop including signal generators 58 and 62, control transformers 80 and 81 and differential generators 78 and 79 will not be discussed in detail. It will be clear to one skilled in the art that there are a number of alternative procedures that may be employed to set the indicators 84 and 85 to the correct heading indication with the electrical signals in balance so that the motor generator 72 will be stationary. For example, to briefly review one procedure, the differential generators 78 and 79 may be short circuited and the rotors of control transformers 80 and 81 will be rotated until the system is electrically balanced when the indicators 84 and 85 may be set to a given heading which will be referred to the gyro azimuth. Then when the short circuits are removed, the stators of control transformers 80 and 81 may be rotated until any unbalance signal that may be introduced by the differential generators 78 and 79 is eliminated.

In order to initially calibrate the system, i.e. to relate the gyro maintained azimuth to geographic north and to the heading of the craft, some procedure must be followed that is sufficiently accurate so that the error in heading thus introduced will be a minimum. We prefer to make use of the gyro itself in a north seeking mode;

that is, to have the gyro system act as a gyro compass or meridian seeking gyro while the craft is stationary prior to the beginning of a trip. In order to do this, the single degree of freedom gyro 16 is bodily rotated ninety degrees by means of the motor 34, so that the gyro's input axis lies in the horizontal instead of the vertical. Thus when the input axis lies in the horizontal, and because the platform 18 is maintained horizontal about two axes at right angles to one another, the earth's rotation will create a torque about the input axis of the gyro unless or until the input axis is aligned directly east and west. This torque will cause the gyro to precess about its output axis and so create a signal in the pick-off 32 which signal will be fed to the motor 54 and cause it to run in such a direction that the torque about the input axis will be eliminated by setting the location of the input axis in the east-west direction. Consequently the system will operate to seek a geographic azimuth reference that is accurately related to a true north direction. There will be no ambiguity between north and south because the direction that the gyro 16 will precess depends upon the direction of rotation of the rotor 22 about its spin axis on the shaft 24, and since the rotor 22 will have a given direction of rotation, the direction of the precession, and hence of the rotation of the platform 18, will be predetermined. Therefore, which side of the platform 18 is toward north (when the motor 54 has ceased running because the signals from pick-off 32 are zero) can be determined in advance.

The torque about the input axis in this north seeking mode of gyro operation may be best explained by an example. Assuming the craft is stationary and it is desired that the true heading be accurately determined before a trip is begun, the steps to be followed will include the following: The gyro stabilizer 68 will be energized and signals will be fed from there to the motors 46 and 64 to level up the platform 18 and keep it in the horizontal. Then the casing of gyro 16 will be rotated exactly ninety degrees by means of the motor 34. Next, the gyro input axis must be accurately aligned into the horizontal within the casing. This is accomplished by throwing a switch 172 to the opposite position from that illustrated so that the signals from the pick-off 32 will be fed to an amplifier 174 and from there to the torque motor 30 of the gyro 16. This will cause the torque motor 30 to rotate gimbal 26 about its shafts 28 and 29 until the signals from pick-off 32 are zero and then the input axis of the gyro 16 will lie in the horizontal (at right angles to its vertical position illustrated in FIG. 1c). Then the switch 172 will be returned to the position illustrated, and the north seeking action described above will take place. The torque about the input axis of gyro 16 due to the earth's rotation is created because the platform 18 and consequently the shafts 28 and 29 of the gyro are being maintained horizontal while the gyro maintained inertial axis is tending to remain stationary in space, not horizontal. From the solid geometry of the situation it will be evident that there is one position for the input axis of the gyro 16, relative to the earth, where this torque will not be created, because the gyro maintained inertial axis that is stationary in space does remain horizontal. Consequently the precession of gyro 16 caused by the earth's rotation torque or a component thereof, will produce signals in the pick-off 32 and so cause the motor 54 to rotate the platform 18 and gyro 16 until this one position for the input axis of the gyro 16 is reached when the signals from the pick-off 32 will be zero. Therefore a true geographic reference may be had so that the craft's heading may be accurately related to north.

The operation of the computer in introducing corrections for earth's rate and craft's rate at the rotors of differential generators 78 and 79 (FIG. 1b), will be best set forth by several operative examples with reference to the circuit details as illustrated in FIGS. 2a-2d. First of all it should be noted that relays are used as the primary control means. Also, there are the three cams C1, C2 and C3 (FIG. 2a) that are driven in correspondence with the craft's present latitude and act to control the operations of the computer in order to produce the required sense of output rotation depending upon the hemisphere, the direction of travel of the craft whether easterly or westerly, etc. Furthermore, there is the stepping switch having four levels as illustrated and having twenty positions labeled $a$ through $u$ (omitting $l$), which steps around one complete circle from the home position $a$ each time a computer cycle is initiated. (The stepping switch contacts are illustrated in a semi-circle for convenience in drawing the circuit diagram.)

The cams C1 and C2 provide for equatorial crossing detection. The accuracy of such detection should be sufficient to avoid accumulating any errors if the craft travels close to the equator for any appreciable distance. Therefore cam C1 is a fine detection cam which makes a predetermined number of revolutions to one of the cam C2, and it is cam C1 that makes the equatorial crossing determination with the required degree of accuracy by means of its switch. As may be seen in FIG. 2a, the hemisphere relay 101 controls a circuit over its contacts A101, which circuit includes the switch controlled by cam C1 in series with the switch controlled by cam C2. In this way the opening or closing of the cam C1 switch is the accurate equatorial crossing indication during one particular revolution of cam C1, which revolution is determined by the switch controlled by the course detection cam C2. Cam C3 gives hemisphere indication when a navigation problem is initiated.

Consider first the processing of a positive angular azimuth correction. Assume that the binary number to be read from the tangent drum 124 (FIG. 2c) is 11101010111000. The binary one in the $2^{13}$ position on the drum 124 will be represented by a set of contacts 154 being closed. Therefore, during a cycle of the stepping switch, four sequential pulses will each pass through closed contacts 154 from stepping switch level 4 (FIG. 2d) and each energize the positive ratchet coil D2 via the obvious circuit that may be traced from a + supply line 156 to contact arm 121 and then via stepping switch contact points $b$, $d$, $f$ and $h$ to the contacts 154 and back via contacts C110 and C112 to one side of the ratchet coil D2, the other side of which is grounded. Similarly, the binary one in the $2^{12}$ position is represented by having contacts 158 (FIG. 2c) closed. In this case, however, only two sequential pulses are produced from the switch contact points $j$ and $m$ (FIG. 2d) of level 4 of the stepping switch over similar circuits that now include the $2^{12}$ contacts 158. Then again the binary one in the $2^{11}$ position is represented by having contacts 160 closed, and in this case one pulse only will be produced as the stepping switch contact $o$, level 4, is closed. These pulses through the ratchet coil D2 produce a positive rotation of the rotors of the high and low speed differential generators 78 and 69 (FIG. 1b), each pulse producing a predetermined amount of rotation depending upon the design of the ratchet motor. As explained above, the positive ratchet coil D2 will cause a rotation in a given direction while the negative ratchet coil D3 will produce the opposite direction of rotation.

Binary ones in any of the remaining $2^{10}$, $2^9$, $2^8$, $2^7$, $2^6$, $2^5$, $2^4$, $2^3$, $2^2$, $2^1$, or $2^0$ drum positions will be added in the electronic accumulator 126 (FIG. 2a). The accumulator 126 has its inputs for the elements 128 (representing binary ones from the $2^{10}$ one to the $2^0$ one) connected to the stepping switch, level 3 contacts $b$ to $m$, respectively. Therefore, by means of circuits to be traced, a timed-sequenced pulsing of the elements 128 is had, dependent upon the state of the corresponding drum contact points. Continuing with the same example given above, there are binary ones in the $2^9$, $2^7$, $2^5$, $2^4$, and $2^3$ tangent drum 124 positions, and so these contacts of the drum 124 will be closed to the right as viewed in FIG. 2c, and pulses will be inserted into the inputs of the corresponding accumulator elements 128, e.g. a pulse circuit for the binary one in the $2^9$ position on the drum may be traced from a "—" supply line 162 over contacts B110 (now energized to the down position when viewed as illustrated in FIG. 2d) to contacts D111 (now de-energized), then to contacts 164 of tangent drum 124, and from there to contact $c$ of level 2 of the stepping switch. The circuit then continues over contact arm 120 of level 2 and goes to contact arm 118 of level 3 (FIG. 2a) and then via contact $c$ of level 3 to the input of the $2^9$ element 128 of the accumulator 126. In the accumulator 126, internal carries between elements 128 thereof will be processed completely before another input signal can be introduced by the stepping switch. If the accumulator 126 holds, at the end of a reading cycle by the stepping switch, a number equal to or greater than $2^{11}$, the positive ratchet coil D2 will be pulsed once, and the $2^{11}$ element 128 of the accumulator 126 will be restored to its zero condition. The pulsing of ratchet coil D2 is accomplished by an accumulator relay 115 (FIG. 2c) that is in the binary "one" tube plate circuit of the $2^{11}$ element 128. When relay 115 is energized, a circuit to pulse the ratchet coil D2 is completed from "+" supply line 156 to contact $t$ of level 2, then to contact $t$ of level 3 via the connection between contact arms 120 and 118, and then back to contacts A115 and then directly to one side of ratchet coil D2, the other side of which is grounded.

Consider next the processing of a negative angular azimuth correction. The computer is so designed that the accumulator 126 only adds positive numbers; therefore any negative angular increment correction must be obtained by an interaction of the accumulator 126 and the digital servo motor comprising positive and negative ratchet coils D2 and D3. For example, take a negative correction for craft's rate having a binary number with binary digits 1, 0 and 1 stored in the $2^{13}$, $2^{12}$ and the $2^{11}$ tangent drum 124 storage positions. The stepping switch level 4 will cause pulses to be set up at the lever 4 contacts $b$, $d$, $u$ and $h$ as well as at contact $o$ of level 4, in the same manner as was the case with positive pulses; but now the complement relay 112 will be energized and therefore the pulses will be transferred to the negative ratchet coil D3 by means of contacts C112. The binary number stored in the lower order positions ($2^{10}$–$2^0$) of the tangent drum 124 is converted into its complement and read into the accumulator 126. The complementary action is obtained by reading from the left (as viewed in FIG. 2c) or break side contact points, e.g. contacts 164, which will be open in the example given. Otherwise, the reading into the accumulator elements 128 is as before, carried over various contacts of levels 2 and 3 of the stepping switch. Additionally, however, during each negative angular heading correction cycle, the negative ratchet coil D3 is pulsed once automatically, as is likewise the $2^0$ accumulator element 128. The circuits for these automatic high and low order pulses will be obvious when it is pointed out that contact $n$ of level 3 is connected to the $2^0$ element 128 of the accumulator 126, while the contact $n$ of level 2 is directly connected to contacts A112 of the complement relay and thence to "—" line 162. Similarly, contact $q$ of level 4 is connected to contacts B112 of the complement relay and so is the negative ratchet coil D3. To best summarize the way in which the computer handles a negative angular azimuth correction, the following table has been prepared:

| Tangent drum storage position | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ | |
|---|---|---|---|---|---|---|---|---|---|---|---|---|---|---|---|
| Tangent drum number (make) | 1 | 0 | 1 | 0 | 1 | 0 | 0 | 1 | 1 | 0 | 0 | 1 | 0 | 1 | = 10853 units |
| Processed by negative ratchet directly | 1 | 0 | 1 | | | | | | | | | | | | = −10240 |
| Automatic neg. ratchet pulse | | | | 1 | | | | | | | | | | | = −2048 |
| Total negative angular increment | | | | | | | | | | | | | | | −12288 units |
| Accumulator input from drum (break) | | | | 1 | 0 | 1 | 1 | 0 | 0 | 1 | 1 | 0 | 1 | 0 | = +1434 |
| Automatic accumulator input pulse | | | | | | | | | | | | | | 1 | = +1 |
| Total positive angular increment | | | | | | | | | | | | | | | +1435 units |
| Total negative angular increment | | | | | | | | | | | | | | | = −12288 |
| Total positive angular increment | | | | | | | | | | | | | | | = +1435 |
| Net angular increment | | | | | | | | | | | | | | | = −10853 units |

To illustrate the operation of the relay control circuits in connection with the storage drums 122 and 124 and the accumulator 126, three operational examples will be given with timing charts to illustrate the described actions.

*Operational Example No. 1*

Assuming a one-half nautical mile east pulse is received over a line 166 (FIG. 2a), marked "½ N.M. East"; and that the craft or plane is in the northern hemisphere heading in an easterly direction. The control actions may be readily traced on the circuit diagram of FIGS. 2a–2d, and the timing of the various actions may be followed with reference to FIG. 3. The control actions are as follows: (it is to be noted that all relay contacts are illustrated in their de-energized positions).

The east relays 103 and 104 are operated by the input east pulse. The plane's rate relays 109 and 110 are then energized. The drum detent coil D1 circuit is then completed. The computation cycle is then commenced by the closure of the detent coil contacts D1A which are in the stepping switch coil S1 circuit.

The tangent storage drum 124 is selected by the operation of the plane's rate relay 110 by its contacts B110 and C110. The binary one in the $2^{13}$ position of the tangent storage drum is transmitted as a series of four pulses by means of level 4 of the stepping switch (points $b$, $d$, $f$ and $h$) into the positive ratchet coil (D2). The binary one in the $2^{12}$ position of the tangent storage drum is transmitted as a series of two pulses by means of level 4 of the stepping switch (points $j$ and $m$) into the positive ratchet coil (D2). Point $o$ of level 4 in the stepping switch is not active during this computer cycle because of the presence of a zero in the $2^{11}$ position of the tangent storage drum. Points $b$ through $m$ of level 2 and points $b$ through $m$ of level 3 are used to transfer the binary data in the tangent drum positions $2^{10}$ to $2^0$ into the accumulator 126. The accumulator 126 contains a binary one in its $2^{11}$ position at the conclusion of this addition process. This carry from the accumulator 126 is transmitted to the positive ratchet coil D2 as a pulse via point $t$ of level 3 of the stepping switch. The accumulator relay 115 is reset by means of points $u$ on levels 1 and 3 of the stepping switch. The reset relay 114 is energized through point $r$ of level 3 of the stepping switch. The reset relay 114 de-energizes the east relays 103 and 104 and plane's rate relays 109 and 110 and detent coil D1. The home relay 116 is energized via point $a$ of level 4 of the stepping switch. This relay 116 is used to de-energize the reset relay 114. The stepping switch coil S1 is energized through the detent contact D1A up to point $r$ in the computation cycle. The stepping switch coil S1 is energized via points $r$, $s$, $t$ and $u$ of level 4 during these points in the computation cycle. It is de-energized at the home point $a$ and cannot be energized again until the home relay 116 has caused the reset relay 114 to re-establish a control path to the stepping switch coil S1.

Operational Example No. 2

To illustrate the computer operation when a negative angular motion is produced, the following example may be traced on the circuit diagram of FIGS. 2a–2d, and the timing may be followed with reference to FIG. 4, assuming the craft is in the northern hemisphere with a westerly heading. A one-half nautical mile west pulse is received over a line 168 (FIG. 2a).

The west relay 102 is operated by the input west pulse. The plane's rate relays 109 and 110 are then energized. The complement relays 111 and 112 are then energized. The drum detent coil D1 circuit is then completed. The computation cycle is then commenced by the closure of the detent coil contacts D1A which are in the stepping switch coil S1 circuit.

The tangent storage drum 124 is selected by the operation of the plane's rate relay 110. The drum complement (normally closed) contact points in the $2^{10}$ to $2^0$ positions are selected by the complement relay 111. The drum (normally open) contact points in the $2^{13}$, $2^{12}$, $2^{11}$ positions are switched by the complement relay 112 to the negative ratchet coil D3. The binary one in the complement side of the $2^{12}$ position of the tangent storage drum 124 is transmitted as a series of two pulses by means of points $j$ and $m$, level 4 of the stepping switch, into the negative ratchet coil D3. The binary one in the complement side of the $2^{11}$ position of the tangent storage drum 124 is transmitted as a single pulse by means of point $o$, level 4 of the stepping switch, into the negative ratchet coil D3. Since the computer is in a complement cycle, the negative ratchet coil is also automatically pulsed once by means of point $q$, lever 4 of the stepping switch, and the $2^0$ electronic accumulator position is automatically pulsed once by means of point $n$ level 2 and point $n$ level 3 of the stepping switch. Points $b$ through $m$ of level 2, and points $b$ through $m$ of level 3 are used to transfer the complementary binary data in the tangent drum 124 positions $2^{10}$ to $2^0$ into the accumulator 126. The accumulator 126 contains a binary one in its $2^{11}$ position at the conclusion of this addition process. This carry from the accumulator 126 is transmitted to the positive ratchet coil D2 as a pulse via point $t$ of level 3 of the stepping switch. The reset action and stepping switch coil control is identical as previously described in connection with Example No. 1.

Operational Example No. 3

To illustrate the computer operation when a two second clock pulse is received, and in addition the operation when a one-half nautical mile west pulse is received during the processing of the time pulse, the following example may be traced, on FIGS. 2a–2d and the timing followed on FIG. 5, assuming the craft is in the southern hemisphere with a westerly heading. A two second clock pulse is received over a line 170. The clock relays 105 and 106 are operated by the input two second clock pulse. The complement relays 111 and 112 and earth's rate relay 113 are then energized. The drum detent coil D1 is then energized. The computation cycle then commences as previously discussed. Since the plane's rate relays 109 and 110 are de-energized, the sine drum 122 is selected.

Binary ones are automatically pulsed into the accumulator $2^{10}$ and $2^9$ positions by means of points $b$ and $c$, level 3, and level 1. The sine drum complement (normally closed) contact points in the $2^8$ to $2^0$ positions are selected by the complement relay 111. Points $d$ through $m$ of level 3 and points $d$ through $m$ of level 1 are used to transfer the complementary binary data in the sine drum positions $2^8$ to $2^0$ into the accumulator 126. Since the computer is in a complement cycle, the negative ratchet coil D3 is automatically pulsed once by means of point $p$, level 4, of the stepping switch, and the $2^0$ electronic accumulator position is automatically pulsed once by means of point $n$, level 2, and point $n$, level 3. The accumulator 126 contains a binary one in its $2^{11}$ position at the accumulator 126 which is transmitted to the positive ratchet coil D2 as a pulse via point $t$ of level 3 of the stepping switch.

This operational example also assumes that a west pulse appears one hundred and twenty-five milliseconds after the initial clock pulse. The east relays 103, 104 are operated by the input west pulse since the craft is in the southern hemisphere. The east-west memory relay 107 is then operated. These relays 103, 104 and 107 remain operated throughout the duration of the computer earth's rate cycle and then initiate a plane's rate computer cycle by establishing circuit paths to the necessary control relays and the stepping switch coil. The plane's rate cycle is then performed as indicated in operational Example No. 2 except that the aircraft is in a different hemisphere.

We claim:

1. An accurate azimuth directional reference system for a vehicle comprising a gyro unit for maintaining a constant azimuth position relative to inertial space, a digital computer for determining directional corrections due to earth's rotation and to the vehicle's displacement over the earth, and master indicator means for adding together algebraically the gyroazimuth position and the directional corrections as determined by said computer in order to produce an azimuth reference that will indicate geographic heading of the vehicle to a high degree of accuracy.

2. An accurate azimuth directional reference system for a vehicle comprising a single degree of freedom gyro unit for maintaing a constant azimuth reference relative to inertial space, a computer including stored digital information corresponding to a constant times the tangent of predetermined increments of latitude and corresponding to the sine of predetermined increments of latitude, means for reading from said stored information the quantities corresponding to the craft's latitude at predetermined increments of travel in an east-west direction and at predetermined increments of time, means for translating said quantities as read into corresponding angular corrections, and a master indicator for summing said azimuth reference and said corrections as determined by said computer in order to determine the heading of the craft accurately at all times.

3. An accurate azimuth directional reference system for a vehicle comprising a platform pivoted about two axes at right angles to one another, a single degree of freedom gyro mounted on said platform with its input axis vertical, means for stabilizing said platform about said axes to maintain the platform horizontal, a pick-off on the output axis of said gyro, servo means controlled by said pick-off for rotating the gyro about its input axis in opposition to any torque about said input axis so that a constant azimuth will be maintained, a computer for determining directional corrections due to earth's rotation and due to the vehicle's displacement over the earth, and master indicator means for adding algebraically the gyro azimuth reference and the corrections as determined by said computer for indicating vehicle's heading accurately.

4. An accurate azimuth directional reference system for a vehicle comprising a platform pivoted about two axes at right angles to one another, a single degree of freedom gyro mounted on said platform with its input axis vertical, means for stabilizing said platform about said axes to maintain the platform horizontal, a pick-off on the output axis of said gyro, servo means controlled by said pick-off for rotating the gyro about its input axis in opposition to any torque about said input axis so that a constant azimuth reference will be maintained, a computer including stored digital information corresponding to a constant times the tangent of predetermined increments of latitude and corresponding to the sine of predetermined increments of latitude, means for reading from said stored information the quantities corresponding to the craft's latitude at predetermined increments of travel in an east-west direction and at predetermined increments of time, means for translating said quantities as read into corresponding angular corrections, and a master indicator for summing said azimuth reference and said corrections as determined by said computer in order to determine the heading of the craft accurately at all times.

5. In a single degree of freedom gyroscope having a pick-off on its output axis and being employed to maintain a constant inertial azimuth reference, apparatus for employing said gyroscope to act as a north seeking gyroscope comprising means for rotating the gyroscope ninety degrees to locate its input axis in a horizontal plane, means for maintaining said input axis in a horizontal plane, and means controlled by said pick-off for rotating the gyroscope about a vertical axis until the input axis lies in a true geographical east-west direction.

References Cited in the file of this patent

UNITED STATES PATENTS

| | | |
|---|---|---|
| 1,612,119 | Hewlett et al. | Dec. 28, 1926 |
| 2,427,158 | Poitras et al. | Sept. 9, 1947 |
| 2,573,626 | Taylor | Oct. 30, 1951 |
| 2,614,237 | Goertz | Oct. 14, 1952 |
| 2,620,441 | McCoy et al. | Dec. 2, 1952 |
| 2,633,029 | Lajeunesse | Mar. 31, 1953 |
| 2,662,301 | Beach | Dec. 15, 1953 |
| 2,902,772 | Ciscel | Sept. 8, 1959 |